(No Model.)
P. J. MABYE.
FISHING REEL.
No. 529,658.  Patented Nov. 20, 1894.
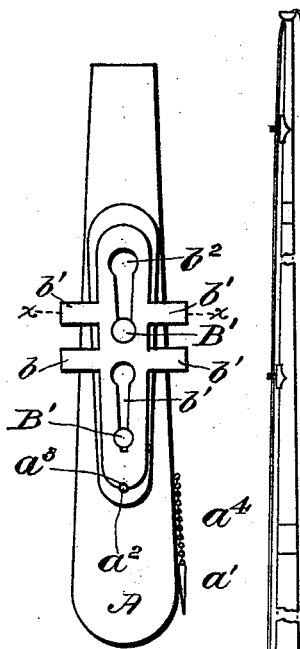
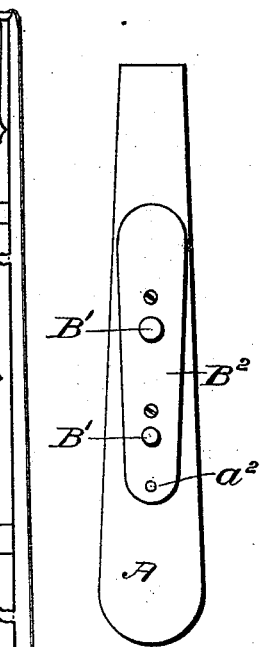
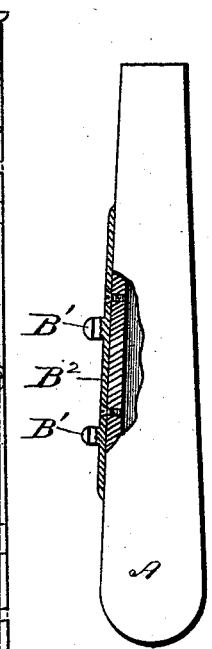
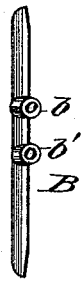
Fig.3  Fig.4  Fig.5  Fig.9
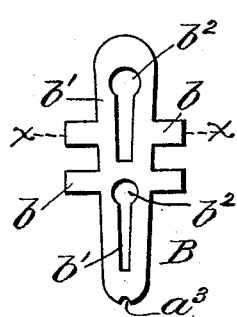
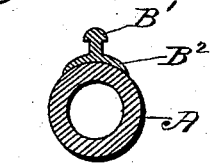
Fig.7  Fig.8
Fig.6  Fig.1  Fig.2  Fig.10
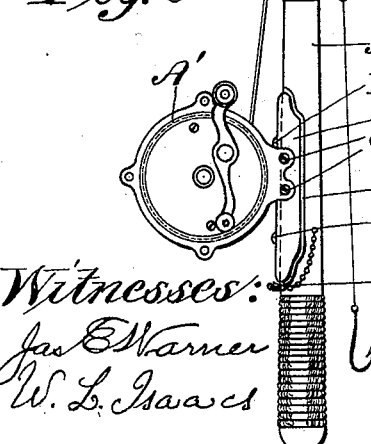
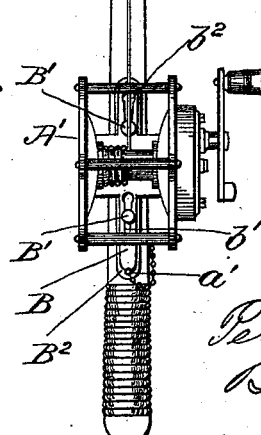
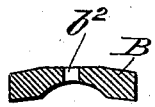
Witnesses:
Jas E Warner
W. L. Isaacs
Inventor:
Peter J. Mabye
By his
H. L. Dennem Attorney.
THE NORRIS PETERS CO., PHOTO-LITHO., WASHINGTON, D. C.

UNITED STATES PATENT OFFICE.

PETER J. MABYE, OF BROOKLYN, NEW YORK, ASSIGNOR OF ONE-HALF TO
WILLIAM H. OGILVIE, OF SAME PLACE.

FISHING-REEL.

SPECIFICATION forming part of Letters Patent No. 529,658, dated November 20, 1894.

Application filed February 2, 1894. Serial No. 498,845. (No model.)

*To all whom it may concern:*

Be it known that I, PETER J. MABYE, a citizen of the United States of America, and a resident of Brooklyn, in the county of Kings and State of New York, have invented new and useful Improvements in Fishing-Reels, of which the following is a specification.

This invention relates to fishing reels and means for attaching the same to a fishing rod and it consists in a slotted plate attached to the reel and adapted to engage lugs extended from the rod.

The means heretofore employed for attaching a reel to a rod is objectionable for the reason that it is necessary to cut away or recess a portion of the rod and this weakens it, and the securing rings employed are apt to slip, and furthermore two movements are necessary to adjust two movable rings, whereas in my invention but one motion is required to fix the reel.

In the accompanying drawings, Figure 1. is a side view of a rod and reel embodying my invention. Fig. 2. is a top view thereof. Fig. 3. is a plan view, on an enlarged scale of the reel plate engaging lugs extended from a section of a rod. Fig. 4. is a plan view of a section of a rod, and the lugs. Fig. 5. is a longitudinal section thereof. Fig. 6. is a plan view. Figs. 7 and 8, are transverse sections through a portion of the rod and the fastening lugs. Fig. 9. is an edge view of the reel plate, and Fig. 10. is a transverse section of the reel plate.

Referring by letter to the drawings A, designates a fishing rod, and A', is the reel mainly of any desired construction.

B, designates the reel plate which may be secured to the reel in any desired manner. As here shown the plate B has laterally extended bosses $b$, which are provided with tapped holes to receive screws which pass through ears $a$, extended from the side plates of the reel.

The plate B, is transversely curved to conform substantially to the rounding of the rod, and the plate is provided with longitudinally tapered slots $b'$, having their broadest part when in position toward the tip of the rod, and having at the broadest end enlarged openings $b'$.

Headed lugs B', are extended from a portion of the rod. As here shown these lugs are integral with or extended directly from a plate $B^2$, adapted to be secured to a section of the rod by means of screws or otherwise. To attach a reel, the lugs B' are passed through the enlarged openings $b^2$, of the slots $b'$, and then the parts are adjusted so that the stem portions of the lugs B', engage in the slots, the slots being tapered in the manner indicated and described. It is evident that the stronger the pull on a fishing line, the tighter the reel will be secured.

To prevent a lateral or pivotal movement of the reel, should one of the lugs B', be broken by accident, it provides an auxiliary locking device, here shown as a pin $a'$, adapted to pass through a hole $a^2$, in the plate $B^2$, into the rod and engaging in a notch $a^3$ formed in the end of the plate B. The pin may be secured to the rod by a chain $a^4$. The pin $a'$ not only serves the purpose above specified but when inserted it prevents an accidental longitudinal movement of the plate B to release the plate from the lugs B'.

Having described my invention, what I claim is—

1. The combination with a fish line reel, of a plate secured thereto and having longitudinally tapered slots provided with enlarged openings at their broadest end, a plate adapted to be secured to a rod, and headed lugs extended from said plate to engage with the slotted plate, substantially as specified.

2. The combination with a reel of a plate secured thereto and provided with slots having enlarged openings at one end, an auxiliary locking pin for engaging with said plate and a rod, a plate secured to a rod and the lugs extended from said rod plate for engaging the reel plate.

3. The combination with a reel of the slotted plate secured thereto and having the notch in its end, the pin adapted to engage with the rod and in said notch, a plate adapted to be secured to a section of a rod, and the locking lugs on said plate, substantially as specified.

In testimony that I claim the foregoing as my invention I have signed my name, in presence of two witnesses, this 31st day of January, 1894.

PETER J. MABYE.

Witnesses:
W. H. OGILVIE,
W. L. ISAACS.